US010439843B2

(12) United States Patent
Sridhar et al.

(10) Patent No.: US 10,439,843 B2
(45) Date of Patent: *Oct. 8, 2019

(54) METHOD AND SYSTEM FOR VIRTUAL AND PHYSICAL NETWORK INTEGRATION

(71) Applicant: Nicira, Inc., Palo Alto, CA (US)

(72) Inventors: Thayumanavan Sridhar, Palo Alto, CA (US); Margaret Petrus, Palo Alto, CA (US); Mallik Mahalingam, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,077

(22) Filed: Jan. 19, 2018

(65) Prior Publication Data

US 2018/0152322 A1 May 31, 2018

Related U.S. Application Data

(63) Continuation of application No. 15/441,212, filed on Feb. 23, 2017, now Pat. No. 9,900,181, which is a (Continued)

(51) Int. Cl.
*H04L 12/46* (2006.01)
*H04L 12/66* (2006.01)
(Continued)

(52) U.S. Cl.
CPC ........ *H04L 12/4641* (2013.01); *H04L 12/413* (2013.01); *H04L 12/4633* (2013.01);
(Continued)

(58) Field of Classification Search
CPC ... H04L 45/74; H04L 12/413; H04L 12/4633; H04L 12/4641; H04L 69/324;
(Continued)

(56) References Cited

U.S. PATENT DOCUMENTS 6,539,432 B1 3/2003 Taguchi et al.
7,046,630 B2 5/2006 Abe et al.
(Continued)

FOREIGN PATENT DOCUMENTS

AU 2013303200 A1 4/2015
CN 1731725 A 2/2006
(Continued)

OTHER PUBLICATIONS

PCT International Search Report and Written Opinion dated Apr. 10, 2013 for commonly owned International Patent Application PCT/US2013/043937, 8 pages, Nicira, Inc.
(Continued)

*Primary Examiner* — Brian D Nguyen
(74) *Attorney, Agent, or Firm* — Adeli LLP

(57) ABSTRACT

The disclosure herein describes a virtual extensible local area network (VXLAN) gateway. During operation, the VXLAN gateway receives, from a physical host, an Ethernet packet destined for a virtual machine residing in a remote layer-2 network broadcast domain that is different from a local layer-2 network broadcast domain where the physical host resides. The VXLAN gateway then determines a VXLAN identifier for the received Ethernet packet. The VXLAN gateway further encapsulates the Ethernet packet with the virtual extensible local area network identifier and an Internet Protocol (IP) header, and forwards the encapsulated packet to an IP network, thereby allowing the packet to be transported to the virtual machine via the IP network and allowing the remote layer-2 network broadcast domain and the local layer-2 network broadcast domain to be part of a common layer-2 broadcast domain.

20 Claims, 7 Drawing Sheets

Related U.S. Application Data continuation of application No. 14/961,801, filed on Dec. 7, 2015, now Pat. No. 9,602,305, which is a continuation of application No. 13/791,264, filed on Mar. 8, 2013, now Pat. No. 9,210,079.

(60) Provisional application No. 61/683,100, filed on Aug. 14, 2012.

(51) Int. Cl.
| | | |
|---|---|---|
| *H04L 12/741* | (2013.01) | |
| *H04L 29/08* | (2006.01) | |
| *H04L 29/12* | (2006.01) | |
| *H04L 12/413* | (2006.01) | |

(52) U.S. Cl.
CPC ............. *H04L 12/66* (2013.01); *H04L 45/74* (2013.01); *H04L 61/103* (2013.01); *H04L 61/2007* (2013.01); *H04L 69/324* (2013.01); *H04L 61/6022* (2013.01)

(58) Field of Classification Search
CPC ... H04L 61/103; H04L 61/2007; H04L 12/66; H04L 61/6022
See application file for complete search history.

(56) References Cited

U.S. PATENT DOCUMENTS

| | | | |
|---|---|---|---|
| 7,120,728 | B2 | 10/2006 | Krakirian et al. |
| 7,260,648 | B2 | 8/2007 | Tingley et al. |
| 7,512,744 | B2 | 3/2009 | Banga et al. |
| 7,937,438 | B1 | 5/2011 | Miller et al. |
| 7,953,865 | B1 | 5/2011 | Miller et al. |
| 7,991,859 | B1 | 8/2011 | Miller et al. |
| 8,018,873 | B1 | 9/2011 | Kompella |
| 8,060,875 | B1 | 11/2011 | Lambeth |
| 8,131,852 | B1 | 3/2012 | Miller et al. |
| 8,166,205 | B2 | 4/2012 | Farinacci et al. |
| 8,224,931 | B1 | 7/2012 | Brandwine et al. |
| 8,224,971 | B1 | 7/2012 | Miller et al. |
| 8,312,129 | B1 | 11/2012 | Miller et al. |
| 8,339,994 | B2 | 12/2012 | Gnanasekaran et al. |
| 8,345,650 | B2 | 1/2013 | Foxworthy et al. |
| 8,370,834 | B2 | 2/2013 | Edwards et al. |
| 8,386,642 | B2 | 2/2013 | Elzur |
| 8,612,627 | B1 | 12/2013 | Brandwine |
| 8,625,616 | B2 | 1/2014 | Vobbilisetty et al. |
| 8,627,313 | B2 | 1/2014 | Edwards et al. |
| 8,644,188 | B1 | 2/2014 | Brandwine et al. |
| 8,660,129 | B1 | 2/2014 | Brendel et al. |
| 8,762,501 | B2 | 6/2014 | Kempf et al. |
| 8,798,056 | B2 | 8/2014 | Ganga |
| 8,838,743 | B2 | 9/2014 | Lewites et al. |
| 8,948,054 | B2 * | 2/2015 | Kreeger ................. H04L 41/12 370/255 |
| 9,106,508 | B2 * | 8/2015 | Banavalikar ............ H04L 45/00 |
| 9,210,079 | B2 | 12/2015 | Sridhar et al. |
| 9,602,305 | B2 | 3/2017 | Sridhar et al. |
| 9,608,833 | B2 * | 3/2017 | Yu ....................... H04L 12/1886 |
| 2006/0245438 | A1 | 11/2006 | Sajassi et al. |
| 2007/0130366 | A1 | 6/2007 | O'Connell et al. |
| 2007/0280243 | A1 | 12/2007 | Wray et al. |
| 2008/0198858 | A1 | 8/2008 | Townsley et al. |
| 2009/0141729 | A1 | 6/2009 | Fan |
| 2009/0292858 | A1 | 11/2009 | Lambeth et al. |
| 2009/0303880 | A1 | 12/2009 | Maltz et al. |
| 2010/0107162 | A1 | 4/2010 | Edwards et al. |
| 2010/0125667 | A1 | 5/2010 | Soundararajan |
| 2010/0257263 | A1 | 10/2010 | Casado et al. |
| 2010/0306408 | A1 | 12/2010 | Greenberg et al. |
| 2011/0022695 | A1 | 1/2011 | Dalal et al. |
| 2011/0075664 | A1 | 3/2011 | Lambeth et al. |
| 2011/0085557 | A1 | 4/2011 | Gnanasekaran et al. |
| 2011/0085559 | A1 | 4/2011 | Chung et al. |
| 2011/0261828 | A1 | 10/2011 | Smith |
| 2011/0268118 | A1 | 11/2011 | Schlansker et al. |
| 2012/0014387 | A1 | 1/2012 | Dunbar et al. |
| 2012/0044943 | A1 | 2/2012 | Hinz et al. |
| 2012/0099602 | A1 | 4/2012 | Nagapudi et al. |
| 2013/0033993 | A1 | 2/2013 | Cardona et al. |
| 2013/0054761 | A1 | 2/2013 | Kempf et al. |
| 2013/0058346 | A1 | 3/2013 | Sridharan et al. |
| 2013/0124750 | A1 * | 5/2013 | Anumala ............ H04L 12/4625 709/232 |
| 2013/0170490 | A1 * | 7/2013 | Kreeger ................. H04L 41/12 370/390 |
| 2013/0188512 | A1 | 7/2013 | Norris et al. |
| 2013/0266015 | A1 | 10/2013 | Qu et al. |
| 2013/0266019 | A1 * | 10/2013 | Qu ........................ H04L 45/74 370/395.53 |
| 2013/0287036 | A1 | 10/2013 | Banavalikar et al. |
| 2013/0297768 | A1 | 11/2013 | Singh |
| 2013/0322446 | A1 | 12/2013 | Biswas et al. |
| 2013/0329728 | A1 | 12/2013 | Ramesh |
| 2013/0332982 | A1 | 12/2013 | Rao et al. |
| 2013/0346592 | A1 | 12/2013 | Kamble et al. |
| 2014/0003434 | A1 | 1/2014 | Assarpour et al. |
| 2014/0016501 | A1 | 1/2014 | Kamath et al. |
| 2014/0029451 | A1 | 1/2014 | Nguyen |
| 2014/0036730 | A1 | 2/2014 | Nellikar et al. |
| 2014/0056151 | A1 | 2/2014 | Petrus et al. |
| 2014/0086253 | A1 | 3/2014 | Yong |
| 2014/0281030 | A1 | 9/2014 | Cui et al. |
| 2016/0226678 | A1 | 8/2016 | Sridhar et al. |
| 2017/0170989 | A1 | 6/2017 | Sridhar et al. |

FOREIGN PATENT DOCUMENTS

| | | |
|---|---|---|
| CN | 102057631 A | 5/2011 |
| CN | 102577331 A | 7/2012 |
| CN | 104704778 A | 6/2015 |
| EP | 1624638 A1 | 2/2006 |
| EP | 2885898 A1 | 6/2015 |
| JP | 2015531212 A | 10/2015 |
| WO | 2011150369 A2 | 12/2011 |
| WO | 2014028094 A1 | 2/2014 |

OTHER PUBLICATIONS

Author Unknown, "Scalable Cloud Networking with Cisco Nexus 1000V Series Switches and VXLAN," CISCO White Paper, Mar. 2012, 6 pages, CISCO Systems Inc., USA.

Koyama, Takaaki, et al., "A Proposal of Redundant Network Architecture Between Cloud Data Centers," IEICE Technical Report, Mar. 1, 2012, 9 pages, vol. III No. 469, Institute of Electronics, Information and Communication Engineers (IEICE), Tokyo, Japan.

Mahalingam, M., et al., "VXLAN: A Framework for Overlaying Virtualized Layer 2 Networks over Layer 3 Networks," Network Working Group Internet Draft, Aug. 26, 2011, 20 pages, Internet Engineering Task Force (IETF) Trust, USA.

Nakagawa, Yukihiro, et al., "A Management Method of IP Multicast in Overlay Networks using OpenFlow," HotSDN '12, Aug. 13, 2012, 6 pages, ACM, Helsinki, Finland.

Takahashi, Kentaro, "Nicira NVP Unveiled New Support Technology by Fabric," Apr. 4, 2012, 12 pages, No. 579, Nikkei Communications, Japan.

Kitazume, Hideo, et al., "Network Virtualization Technology for Cloud Services," NTT Technical Review—Feature Articles: Cloud Computing Platform Technologies for Social Infrastructure, Dec. 2011, 6 pages, vol. 9 No. 12, Nippon Telegraph and Telephone Corporation.

* cited by examiner

METHOD AND SYSTEM FOR VIRTUAL AND PHYSICAL NETWORK INTEGRATION

CLAIM OF BENEFIT TO PRIOR APPLICATIONS

This application is a continuation application of U.S. patent application Ser. No. 15/441,212, filed Feb. 23, 2017, now issued as U.S. Pat. No. 9,900,181. U.S. patent application Ser. No. 15/441,212 is a continuation of U.S. patent application Ser. No. 14/961,801, filed Dec. 7, 2015, now issued as U.S. Pat. No. 9,602,305. U.S. patent application Ser. No. 14/961,801 is a continuation application of U.S. patent application Ser. No. 13/791,264, filed Mar. 8, 2013, now issued as U.S. Pat. No. 9,210,079. U.S. patent application Ser. No. 13/791,264 claims the benefit of U.S. Provisional Application No. 61/683,100, filed 14 Aug. 2012. U.S. patent application Ser. No. 15/441,212, now issued as U.S. Pat. No. 9,900,181; U.S. patent application Ser. No. 14/961,801, now issued as U.S. Pat. No. 9,602,305; U.S. patent application Ser. No. 13/791,264, now issued as U.S. Pat. No. 9,210,079; and U.S. Provisional Patent Application 61/683,100 are incorporated herein by reference.

BACKGROUND

The exponential growth of the Internet has made it a ubiquitous delivery medium for a variety of applications. Such applications have in turn brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, they can freely migrate to various locations. This capability allows service providers to partition and isolate physical resources (e.g., computing power and network capacity) according to customer needs, and to allocate such resources dynamically.

While virtualization brings unprecedented flexibility to service providers, the conventional layer-2 network architecture, however, tends to be rigid and cannot readily accommodate the dynamic nature of virtual machines. For example, in conventional data center architecture, hosts are often inter-connected by one or more layer-2 (e.g., Ethernet) switches to form a layer-2 broadcast domain. The physical reach of a layer-2 broadcast domain is limited by the transmission medium. As a result, different data centers are typically associated with different layer-2 broadcast domains, and multiple layer-2 broadcast domains could exist within a single data center. For a VM in one data center to communicate with a VM or a storage device in another data center, such communication would need to be carried over layer-3 networks. That is, the packets between the source and destination have to be processed and forwarded by layer-3 devices (e.g., IP routers), since the source and destination belong to different layer-2 broadcast domains. While this architecture has benefits, flat layer-2 processing has its advantages. In fact, it would be desirable to exploit the advantages of both layer-3 and layer-2 models and processing capabilities in the network.

One technique to solve the problems described above is to implement a virtual extensible local area network (VXLAN). VXLAN is a standard network virtualization technology managed by the Internet Engineering Task Force (IETF), and works by creating a logical layer-2 network that is overlaid above a layer-3 IP network. Ethernet packets generated by VMs are encapsulated in an IP header before they are transported to a remote data center where the IP header is removed and the original Ethernet packet is delivered to the destination. The IP encapsulation mechanism allows a logical layer-2 broadcast domain to be extended to an arbitrary number of remote locations, and allows different data centers or different sections of the same data center (and hence the VMs and devices therein) to be in the same layer-2 broadcast domain. The VXLAN function typically resides within a host's hypervisor, and works in conjunction with the hypervisor's virtual switch. More details of VXLAN can be found in IETF draft "VXLAN: A Framework for Overlaying Virtualized Layer 2 Networks over Layer 3 Networks," available at https://tools.ietf.org/html/draft-mahalingam-dutt-dcops-vxlan-02, which is incorporated by reference here.

Existing VXLAN implementations, however, cannot easily accommodate a mixture of physical hosts and VMs in the same logical layer-2 broadcast domain. This is because by default the VXLAN feature in a hypervisor encapsulates Ethernet packets generated by a VM that belongs to a certain VXLAN. A physical host, on the other hand, cannot easily participate in the same VXLAN because there is no mechanism to encapsulate the Ethernet packets it generates, which would otherwise allow the Ethernet packets to be delivered to other VXLAN-capable VMs.

SUMMARY

The disclosure herein describes a network communication system that facilitates the integration of virtual and physical network devices. Specifically, the system provides a virtual extensible local area network (VXLAN) gateway. During operation, the VXLAN gateway receives, from a physical host, an Ethernet packet destined for a virtual machine residing in a remote layer-2 network broadcast domain that is different from a local layer-2 network broadcast domain where the physical host resides. The VXLAN gateway then determines a VXLAN network identifier (VNI) for the received Ethernet packet. The VXLAN gateway further encapsulates the Ethernet packet with the VNI and an Internet Protocol (IP) header, and forwards the encapsulated packet to an IP network, thereby allowing the packet to be transported to the virtual machine via the IP network and allowing the remote layer-2 network broadcast domain and the local layer-2 network broadcast domain to be part of a common layer-2 broadcast domain.

Ethernet packet received from the physical host can be an address resolution protocol (ARP) request packet. In addition, the VXLAN gateway maintains a data structure that maps the VNI to an IP multicast group. The VXLAN gateway also sets a destination IP address in the IP header to be an IP address corresponding to the IP multicast group. The VXLAN gateway can also maintain a data structure that maps the physical host's medium access control (MAC) address and optionally the physical host's virtual local area network (VLAN) tag to the VNI. The data structure may also contain entries to encompass all the physical hosts on a specific VLAN. This is indicated as a mapping between the VNI and VLAN tag without any host-specific information.

Additionally, the VXLAN gateway can receive a packet from the virtual machine, wherein the packet includes an outer Ethernet header, an IP header, and an inner Ethernet header. The VXLAN gateway then decapsulates the packet received from the virtual machine by removing its outer Ethernet header and IP header and forwards the decapsulated packet to the physical host. The VXLAN gateway can further establish a tunnel with a second virtual extensible local area network gateway, thereby joining two layer-2 network broadcast domains with a common VNI. Optionally, the VXLAN gateway can receive configuration information from an OpenFlow controller.

BRIEF DESCRIPTION OF FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of enabling VXLAN-encapsulated communication between a VM and a physical host by facilitating a VXLAN gateway, which serves as a gateway for the physical host and performs VXLAN encapsulation and decapsulation on behalf of the physical host. As mentioned above, the VXLAN feature in a hypervisor (such as the ESX® product family by VMware, Inc. of Palo Alto, Calif.) automatically encapsulates an Ethernet packet generated by a VM that is part of a VXLAN-enabled Ethernet broadcast domain. There is currently no ready-to-use mechanism that can allow a physical host, which does not have this VXLAN feature in its protocol stack, to participate in this VXLAN-enabled broadcast domain. This is because there is no device in the network that can encapsulate the physical host's Ethernet packet with VXLAN headers.

Figure 1:
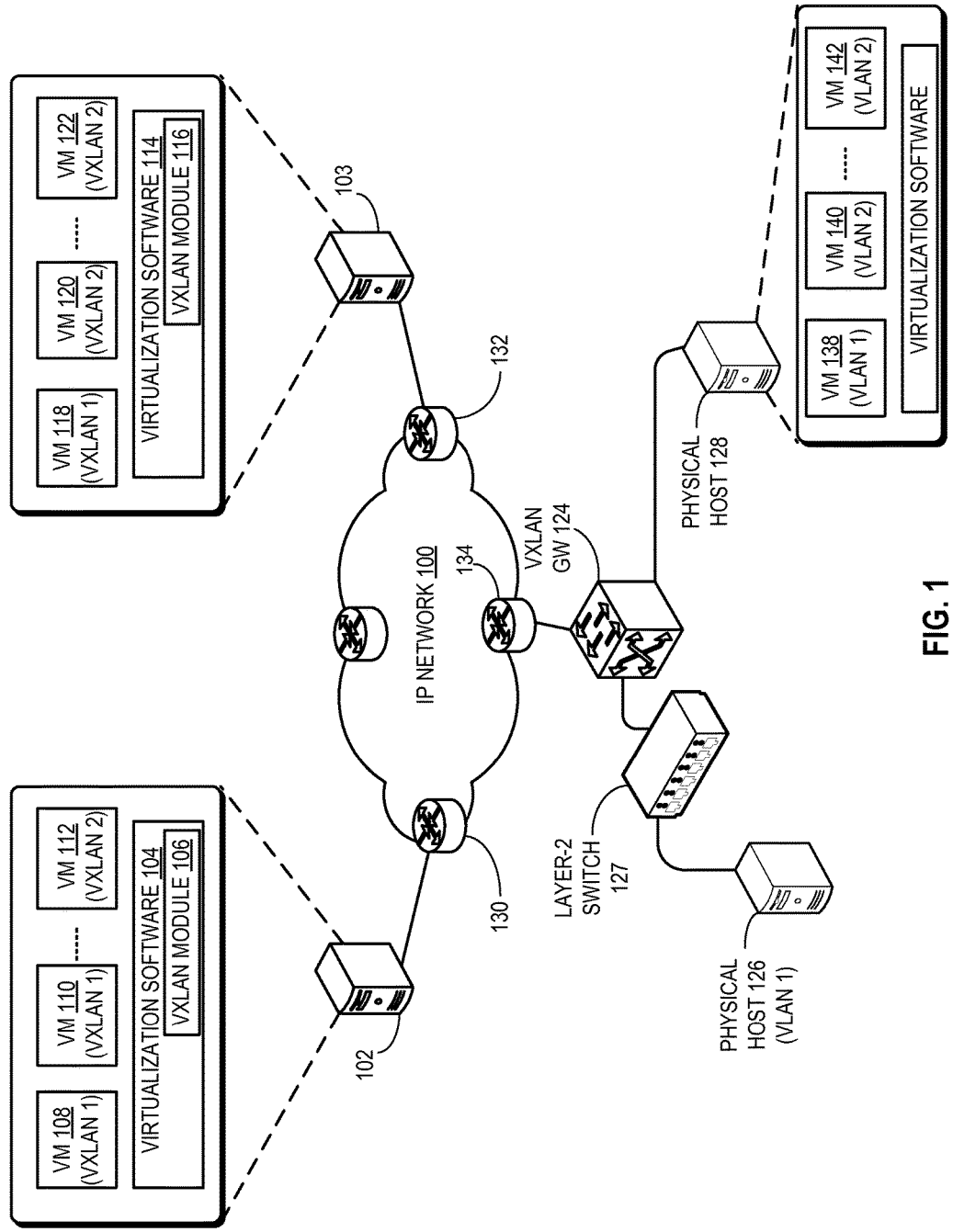
FIG. 1 illustrates an exemplary network architecture that facilitates a VXLAN gateway.

To solve this problem, a VXLAN gateway residing in the same layer-2 broadcast domain as the physical host can perform the VXLAN encapsulation and decapsulation on behalf of the physical host. FIG. 1 illustrates an exemplary network architecture that facilitates a VXLAN gateway. In this example, an IP network 100 couples several conventional layer-2 networks. Specifically, a host 102 is coupled to an IP router 130. Host 102 hosts a number of VMs: 108, 110, and 112. VMs 108 and 110 belong to VXLAN 1, and VM 112 belongs to VXLAN 2. Virtualization software 104 (such as a hypervisor) manages the VMs in host 102, and includes a VXLAN module 106. VXLAN module 106 is responsible for encapsulating and decapsulating the Ethernet packets generated by VMs 108, 110, and 112.

Similarly, a host 103 is coupled to an IP router 132. Host 103 hosts a number of VMs: 118, 120, and 122. VM 118 belongs to VXLAN 1, and VMs 120 and 122 belong to VXLAN 2. Virtualization software 114 manages VMs 118, 120, and 122, and includes a VXLAN module 116. When VMs within the same VXLAN communicate with each other, the Ethernet packet generated by a VM is encapsulated with an IP header and then delivered to the VXLAN module in the destination physical host (which owns the destination IP address).

For example, when VM 108 communicates with VM 118, VM 108 generates an Ethernet packet with VM 118's MAC address as its MAC destination address (DA). (Note that VMs within the same VXLAN are in the same logical layer-2 broadcast domain, and are therefore assumed to learn each other's MAC address.) When this Ethernet packet reaches VXLAN module 106, VXLAN module 106 inspects the packet's MAC source address (SA), MAC DA, and optionally VLAN tag, and determines that both the source (VM 108) and destination (VM 118) belong to VXLAN 1. Furthermore, based on the packet's MAC DA, VXLAN module 106 determines the IP address of the destination physical host 103. In turn, VXLAN module 106 encapsulates this Ethernet packet with a proper VXLAN header and IP header (which will be described in more detail in conjunction with FIG. 2), and transmits this encapsulated packet to IP router 130. Since the encapsulated packet has an IP destination address that is associated with host 103, IP router 130 (and other IP routers in IP network 100) can then make the proper forwarding decision and forwards the encapsulated packet toward host 103.

When host 103 receives the encapsulated packet, VXLAN module 116 first removes the IP header to expose the inner Ethernet packet. Subsequently, based on both the VNI and the inner Ethernet header's MAC DA, virtualization software 114 forwards the inner Ethernet packet to VM 118. Note that when VXLAN 116 receives the Ethernet packet, it can establish a mapping relationship of the MAC SA of the inner Ethernet packet (which is VM 108's MAC address) and the IP source address (which is host 102's IP address). Hence, when in the future VM 118 sends an Ethernet packet to VM 108, VXLAN module 116 can perform VXLAN encapsulation with host 102's IP address as the IP destination address.

In the situation where a source VM does not have knowledge of a destination VM's MAC address (and only the destination VM's IP address), the source VM typically issues an address resolution protocol (ARP) request with the destination VM's IP address. This ARP request is a broadcast layer-2 message, which is supposed to be received by all the hosts (and VMs) in a layer-2 broadcast domain. In the case of VXLAN, for example, when VM 108 sends out an ARP request, this ARP request first reaches VXLAN module 106. In turn, when VXLAN module 106 determines that it is an ARP request that is supposed to be broadcast to the entire VXLAN, VXLAN module 106 encapsulates the ARP request with an IP header that has an IP multicast group address as its destination IP address. That is, each VXLAN is associated with an IP multicast tree that includes all the physical hosts in the VXLAN. This way, when there is a broadcast packet for the entire VXLAN, a VXLAN module in a host's hypervisor can encapsulate the packet with an IP multicast header, and multicast this encapsulated packet to all the hosts in the VXLAN.

Hence, the ARP request would be multicast to all the hosts associated with the same VXLAN. The VXLAN module on each receiving host would decapsulate the packet, and locally broadcast the inner ARP request to all the VMs belonging to that VXLAN. In response, the VM that has an IP address that matches the one in the ARP request produces an ARP response, which would be encapsulated by the local VXLAN module and unicast back to the requesting VM.

In the example illustrated in FIG. 1, if a physical host (or a VM that is not VXLAN-capable) is coupled to IP network 100, either directly or via a layer-2 switch, it would be difficult, if not impossible, for the physical host to communicate with any VM that belongs to a VXLAN, because an Ethernet packet from the physical host cannot be delivered to any of the VMs since the Ethernet packet is not probably encapsulated with a VXLAN header and IP header. One solution is to use a VXLAN gateway 124, which can be a stand-alone device that performs the functions of VXLAN module 106 or 108. For example, a physical host 126 can be coupled to VXLAN gateway 124 via a layer-2 switch 127. Physical host 126 belongs to VLAN 1, which is mapped to VXLAN 1 by VXLAN gateway 124. A physical host 128 can host a number of VMs 138, 140, and 142, which are not VXLAN enabled. VM 138 belongs to VLAN 1, which maps to VXLAN 1. VMs 140 and 142 belong to VLAN 2, which maps to VXLAN 2. Host 128 is also coupled to VXLAN gateway 124.

When physical host 126 is to communicate with VM 108, physical host 126 can send out an Ethernet packet with VM 108's MAC address as the MAC DA, its own MAC address as the MAC SA, and a VLAN tag corresponding to VLAN 1. When this Ethernet packet reaches VXLAN gateway 124, VXLAN gateway 124 inspects the packet's MAC SA and MAC DA, and its VLAN tag. Note that VXLAN gateway maintains a set of mapping information that maps a MAC address and optionally a VLAN tag to a VXLAN. Note that the data structure to maintain the mapping information may also contain entries to encompass all the physical hosts on a specific VLAN. This is indicated as a mapping between the VNI and VLAN tag without any host-specific information. If physical host 126 is properly configured, VXLAN gateway 124 would identify the Ethernet packet's MAC SA and MAC DA (and optionally VLAN tag) to be associated with VXLAN 1. (Note that if the VLAN tag is present, VXLAN gateway 124 may directly map the VLAN to a VXLAN without using the MAC addresses. If VLAN is not configured, however, VXLAN gateway 124 can map the MAC SA, MAC DA, or both, to the VXLAN.) Furthermore, VXLAN gateway 124 also maintains a set of mapping information between a VM's MAC address and the IP address of that VM's physical host. Hence, based on the MAC DA of the Ethernet packet generated by physical host 126, which is VM 108's MAC address, VXLAN gateway 124 determines that host 102's IP address should be used as the destination IP address for the VXLAN encapsulation. In addition, VXLAN gateway 124 uses its own IP address as the source IP address for the encapsulation. Subsequently, VXLAN encapsulates the Ethernet packet from host 126 with the proper VXLAN header and IP header and transmits the encapsulated packet to IP network 100.

When the encapsulated packet reaches host 102, the encapsulated packet is forwarded to VXLAN module 106. VXLAN module 106 in turn removes the IP header to obtain the inner Ethernet packet. Note that VXLAN module 106 can learn the mapping between the source IP address of the IP header (which is VXLAN gateway 124's IP address) and the MAC SA of the inner Ethernet packet (which is host 126's MAC address). This mapping information is used to encapsulate outbound traffic to host 126. Subsequently, VXLAN module 106 forwards the inner Ethernet packet to VM 108 based on the MAC DA.

When VM 108 sends an Ethernet packet back to host 126, a similar VXLAN encapsulation/decapsulation process takes place. Specifically, VXLAN module 106 identifies that the Ethernet packet from VM 108 to host 126 belongs to VXLAN 1. Furthermore, based on the Ethernet packet's MAC DA (which is host 126's MAC address), VXLAN module 106 identifies host 126's IP address as the destination IP address for the VXLAN encapsulation, and uses host 102's IP address as the source IP address. Host 102 then sends the encapsulated Ethernet packet to IP network 100, which delivers the packet to VXLAN gateway 124. VXLAN gateway 124 then decapsulates the packet by removing its IP header, and forwards the inner Ethernet packet to host 126.

Figure 2:
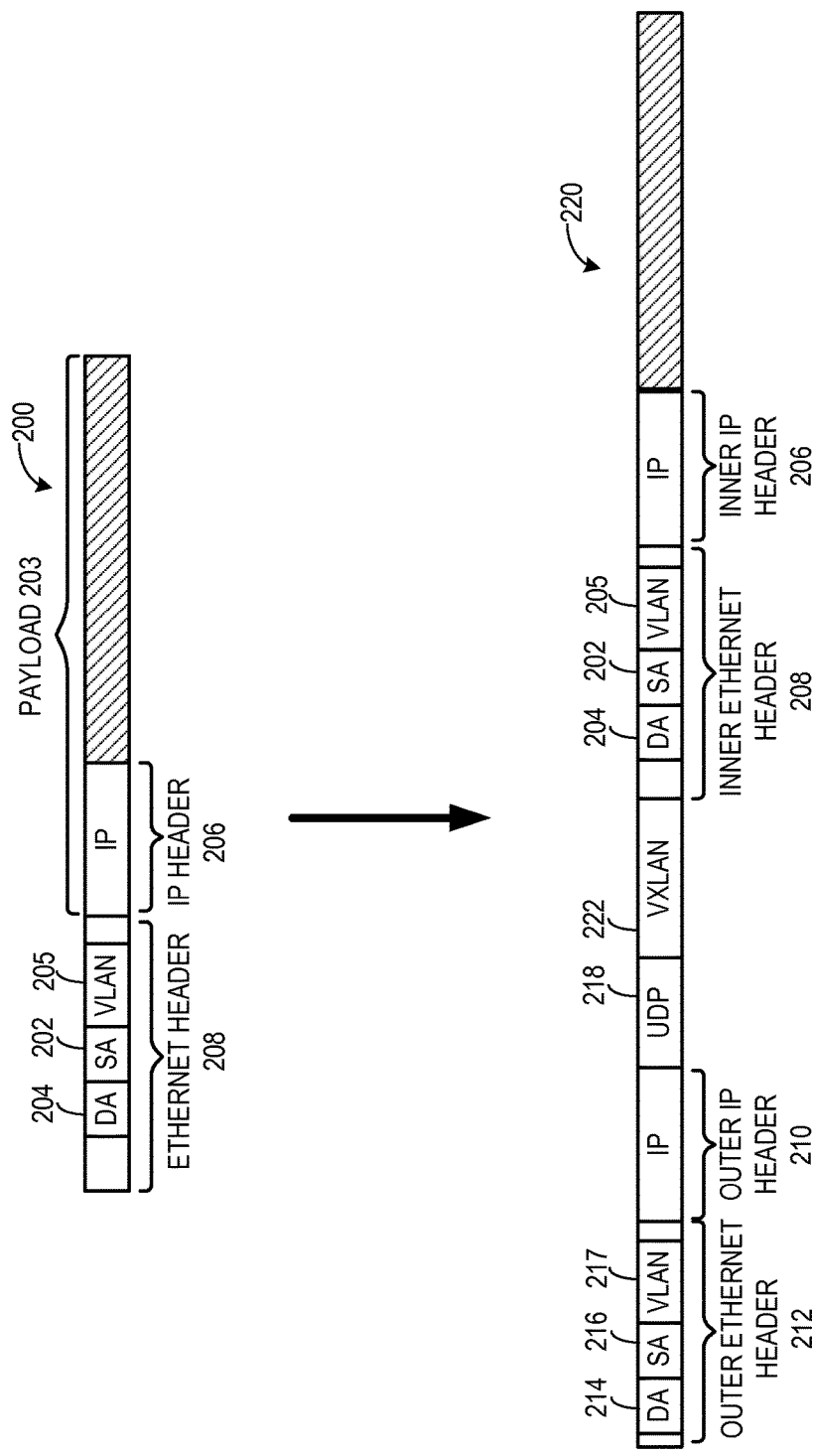
FIG. 2 illustrates header format for a conventional Ethernet packet and its VXLAN encapsulation.

FIG. 2 illustrates header format for a conventional Ethernet packet and its VXLAN encapsulation. In this example, a conventional Ethernet packet 200 typically includes a payload 203 and an Ethernet header 208. Typically, payload 203 can include an IP packet which includes an IP header 206. Ethernet header 208 includes a MAC DA 204, a MAC SA 202, and optionally a VLAN tag 205.

In one embodiment, VXLAN gateway 124 can encapsulate conventional Ethernet packet 200 into an encapsulated packet 220. Encapsulated packet 220 typically includes a VXLAN header 222 which contains a VNI to indicate the VXLAN to which inner Ethernet packet 200 belongs, a UDP header 218 which indicates the transport-layer protocol and port number reserved for VXLAN, and an outer IP header 210. In addition, encapsulated packet 220 includes an outer Ethernet header 212.

Take, for example, Ethernet packet 200 as an Ethernet packet generated by host 126 and destined for VM 108. Typically, an upper layer application in host 126 would generate an IP packet destined for VM 108, using VM 108's IP address. This IP packet becomes payload 203, and VM 108's IP address would be the destination IP address in IP header 206. In addition, host 126's IP address would be the source IP address in IP header 206. The datalink layer in host 126 then generates Ethernet header 208 to encapsulate payload 203. MAC DA 204 of Ethernet header 208 would be VM 108's MAC address, and MAC SA 202 of Ethernet header 208 would be host 126's MAC address. This is based on the assumption that host 126 has learned VM 108's MAC address. In the case where host 126 does not have knowledge of VM 108's MAC address, host 126 can use ARP to discover VM 108's MAC address. This ARP process is described in conjunction with FIG. 3. Host 126 then sends Ethernet packet 200 to VXLAN gateway 124.

When VXLAN gateway 124 receives Ethernet packet 200 from host 126, VXLAN gateway 124 inspects the Ethernet MAC DA 204, MAC SA 202, and optionally VLAN tag 205. Based on this information VXLAN gateway 124 determines that Ethernet packet 200 is associated with VXLAN 1. Furthermore, based on MAC DA 204, VXLAN gateway 124 determines that the destination IP address for VXLAN encapsulation is the IP address of host 102. Subsequently, VXLAN gateway 124 assembles the VXLAN header which includes VXLAN header 222 (corresponding to VXLAN 1), and attaches UDP header 218 which includes the appropriate UDP port number. In addition, VXLAN gateway 124 assembles outer IP header 210 which uses host 102's IP address as the destination address, and VXLAN gateway 124's own IP address as the source address. VXLAN gateway 124 then assembles an outer Ethernet header 212. Outer Ethernet header 212 is used to transport packet 220 from VXLAN gateway 124 to the next-hop IP router 134. Outer Ethernet header 212 has a MAC DA 214 which is IP router 134's MAC address, a MAC SA which is VXLAN gateway 124's MAC address, and optionally an outer VLAN tag 217.

Once packet 220 reaches IP router 134, IP router 134 can remove outer Ethernet header 212 and forward the packet based on outer IP header 210. This process continues throughout IP network 100 until the packet reaches host 102.

Figure 3:
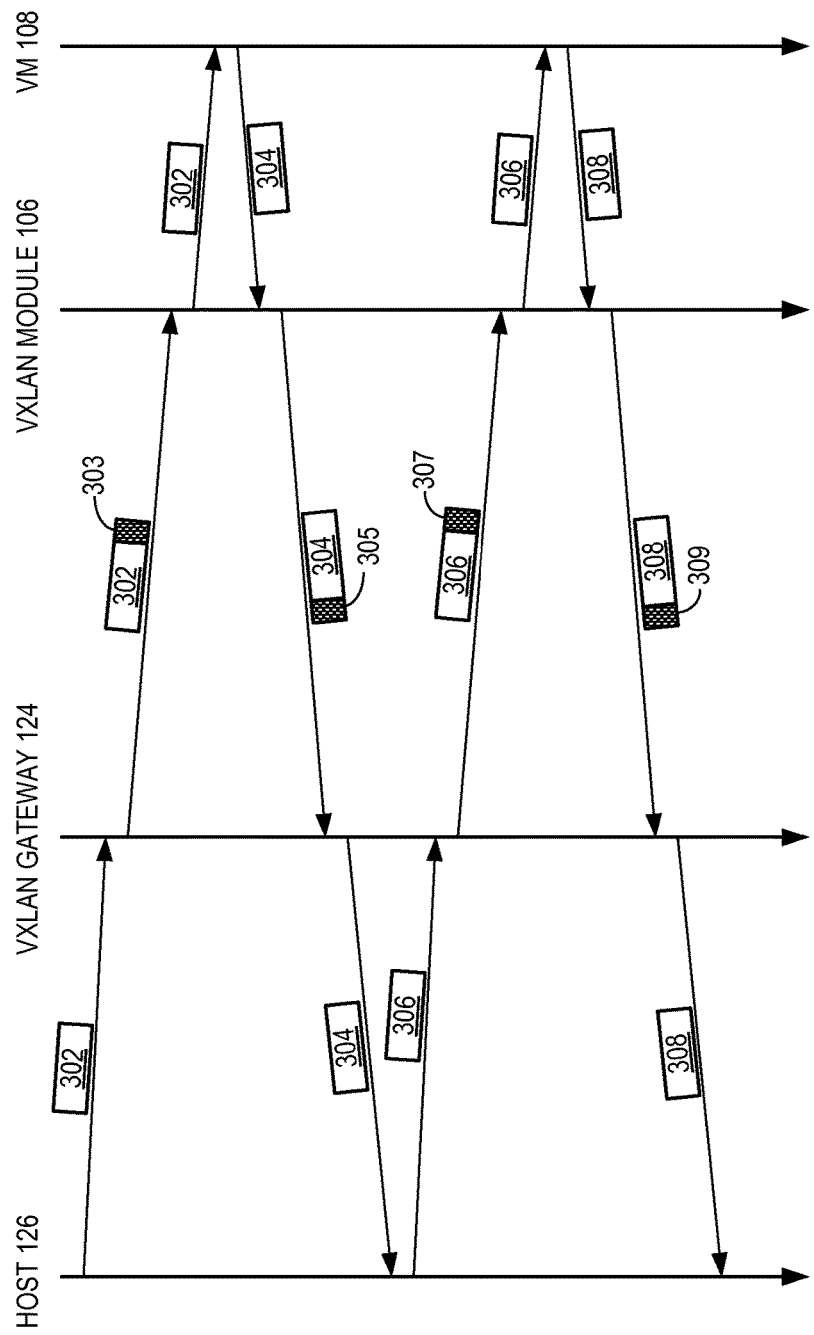
FIG. 3 presents a time-space diagram illustrating an exemplary process of a physical host initiating communication with a VM across an IP network, via a VXLAN gateway.

As mentioned above, when host 126 attempts to communicate with VM 108 for the very first time, host 126 might only have VM 108's IP address but not its MAC address. To discover VM 108's MAC address, host 126 can perform an ARP query operation. FIG. 3 presents a time-space diagram illustrating this process. Initially, host 126 generates an ARP request message which is carried in an Ethernet broadcast packet 302. Host 126 then transmits broadcast packet 302 to VXLAN gateway 124. In turn, VXLAN gateway 124 identifies that host 126 belongs to VXLAN 1 based on the MAC SA of packet 302. In addition, since packet 302 is an Ethernet broadcast packet, VXLAN gateway 124 maps packet 302 to an IP multicast group corresponding to VXLAN 1, and generates an IP multicast header 303 to encapsulate packet 302. Note that the IP multicast group includes both hosts 102 and 103, since these two hosts both host VMs belonging to VXLAN 1 (VMs 108 and 110 on host 102, and VM 118 on host 103). This IP multicast packet is then delivered by IP network 100 to both hosts 102 and 103. VXLAN module 106 on host 102 then removes IP header 303 from packet 302 and locally broadcasts packet 302 to all the VMs (i.e., VMs 108 and 110) belonging to VXLAN 1. In addition, VXLAN module 106 learns the mapping between host 126's MAC address, which is the MAC SA in packet 302, and the corresponding IP address, which is VXLAN gateway 124's IP address and the source IP address in the IP multicast packet.

Similarly, VXLAN module 116 on host 103 receives the same IP multicast packet and forwards the inner Ethernet broadcast packet 302 to VM 118 (not shown in FIG. 3).

Subsequently, VM 108 determines that its IP address matches the IP address in the ARP request in packet 302. In response, VM 108 generates an ARP response message and encapsulates it in an Ethernet unicast packet 304, which has host 126's MAC address as the MAC DA and VM 108's own MAC address as the MAC SA. VXLAN module 106 on host 102 then encapsulates packet 304 with a unicast IP header 305. The source IP address of IP header 305 is host 102's IP address, and the destination IP address is VXLAN gateway 124's IP address. When this unicast IP packet reaches VXLAN gateway 124, VXLAN gateway 124 removes IP header 305, and forwards the inner Ethernet packet 304 to host 126. In turn, host 126 retrieves the ARP response carried in packet 304, and learns VM 108's MAC address.

Next, host 126 generates a regular unicast Ethernet packet 306 that carries a payload to VM 108. The MAC DA of packet 306 is VM 108's MAC address, which was learned by host 126 based on packet 304 (the ARP response). The MAC SA of packet 306 is host 126's MAC address. VXLAN gateway 124 then encapsulates packet 306 with a VXLAN header followed by a unicast IP header 307. IP header 307 has host 102's IP address as its destination IP address, and VXLAN gateway 124's IP address as its source IP address. Subsequently, VXLAN module 106 on host 102 removes IP header 307 and forwards inner Ethernet packet 306 to VM 108.

When VM 108 sends an Ethernet packet 308 in return, VXLAN module 106 encapsulates packet 308 with a unicast IP header 309. Unicast IP header 309 has VXLAN gateway 124's IP address as its destination IP address, and host 102's IP address as its source IP address. VXLAN gateway 124 then receives the encapsulated packet, removes IP header 309, and forwards inner Ethernet packet 308 to host 126.

Figure 4:
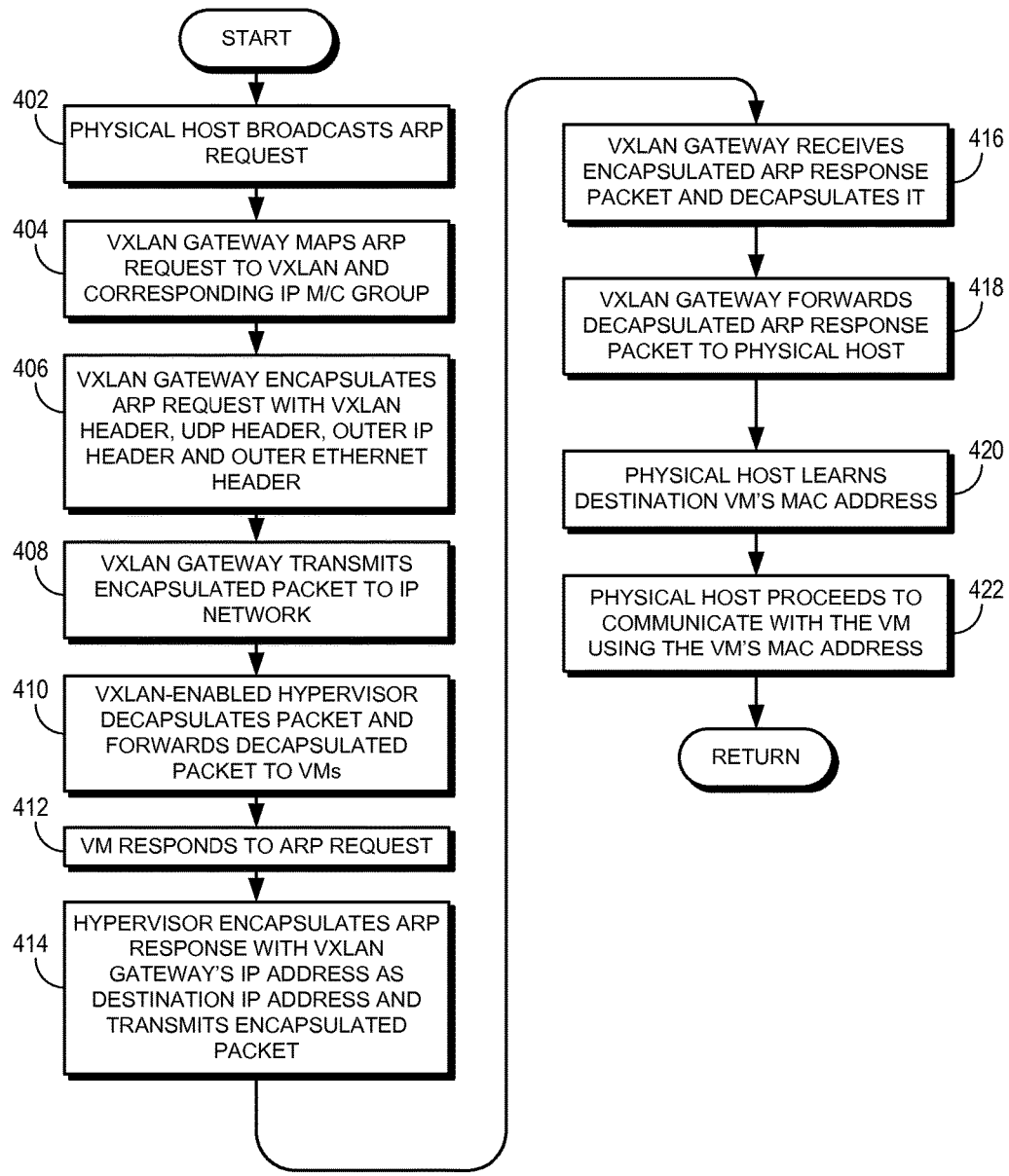
FIG. 4 presents a flow chart illustrating an exemplary process of a physical host communicating with a VM via a VXLAN gateway.

FIG. 4 presents a flow chart illustrating a general process of a physical host communicating with a VM via a VXLAN gateway. During operation, to initiate communication with a VM in a VXLAN, a physical host first broadcasts an ARP request which reaches the VXLAN gateway (operation 402). In response, the VXLAN gateway maps the ARP request to a particular VXLAN and the corresponding IP multicast group based on the physical host's MAC address and optionally its VLAN tag (operation 404). The VXLAN gateway encapsulates the ARP request with a VXLAN header, a UDP header, and an outer IP header (which includes an IP multicast group address as destination IP address) and an outer Ethernet header (operation 406). The VXLAN gateway then transmits the encapsulated packet to the IP network (operation 408).

The encapsulated packet is delivered by the IP network to all the hosts that host VMs belonging to the same VXLAN. As a result, a VXLAN-enabled hypervisor on the host which hosts the VM corresponding to the ARP request receives the encapsulated packet, decapsulates the packet, and forwards the inner ARP request to the VMs belonging to the same VXLAN and running on the host (operation 410). Subsequently, the VM with an IP address matching the ARP request responds to the ARP request (operation 412). In response, the hypervisor for the VM encapsulates the ARP response with the VXLAN gateway's IP address as the destination IP address and transmits the encapsulated packet to the IP network (operation 414).

Next, the VXLAN gateway receives the encapsulated ARP response packet and decapsulates it (operation 416). The VXLAN gateway then forwards the decapsulated ARP response packet to the physical host (operation 418). In turn, the physical host learns the destination VM's MAC address (operation 420). The physical host subsequently can proceed to communicate with the VM using the VM's MAC address as if the VM is residing in the same layer-2 broadcast domain (operation 422).

In some embodiments, in addition to providing the VXLAN function to a non-VXLAN-enabled physical host, VXLAN gateways can also "stitch" two data centers which are not VXLAN-capable into one VXLAN domain with a common VXLAN ID. To facilitate such "stitching," two VXLAN gateways residing within two data centers respectively establish a tunnel (which for example can be IP-based, such as IPSEC based, tunnel in one embodiment) between them. In one embodiment, this tunnel is an IPsec tunnel. The two VXLAN gateways can transparently pass through packets from one data center to the other, hence joining two data centers into a single broadcast domain. Note that IPsec tunnel is used as an example, and any tunneling protocol can be used by the two VXLAN gateways.

Figure 5:
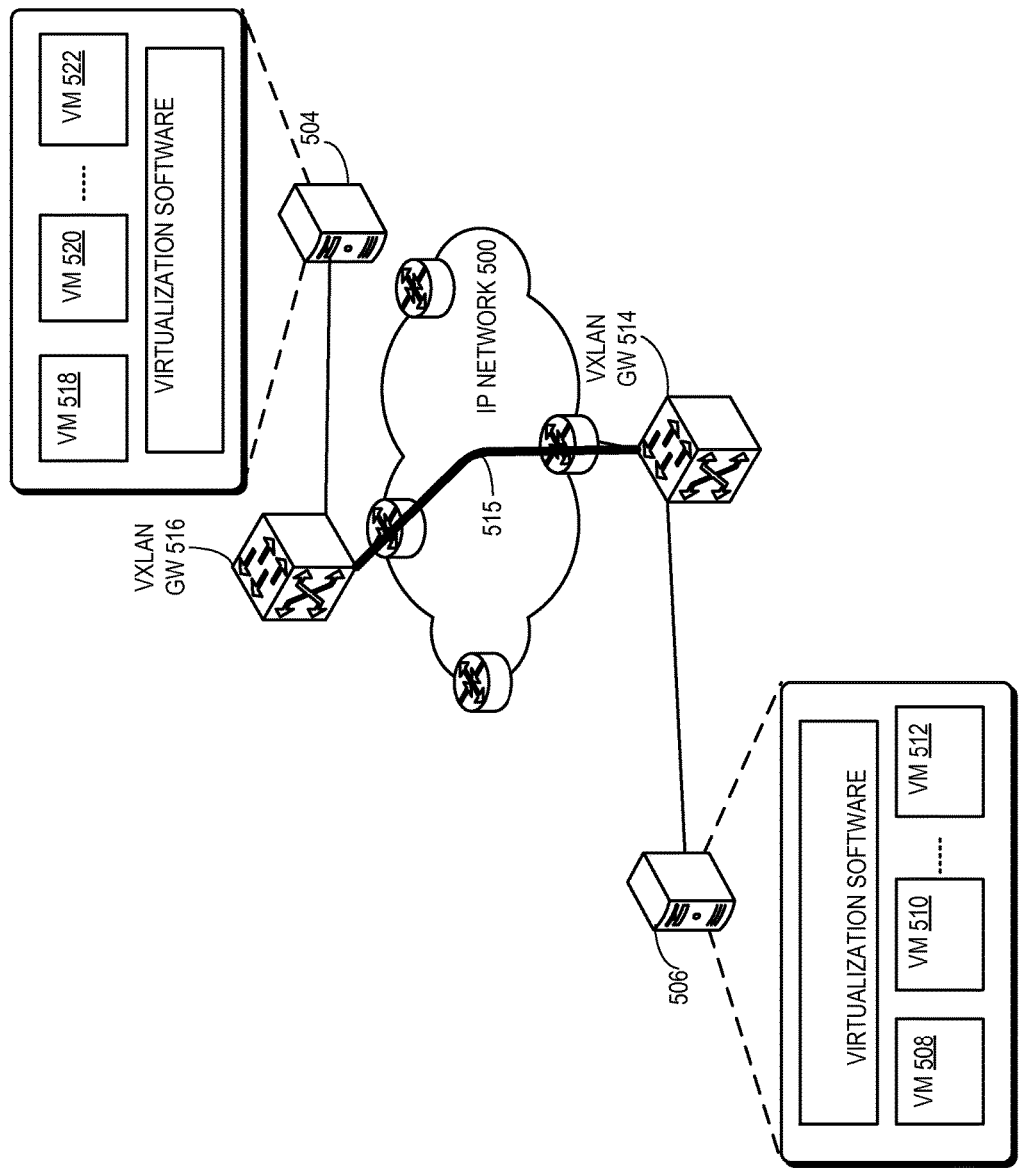
FIG. 5 illustrates an exemplary network architecture where two remotely located data centers are joined to form a single layer-2 broadcast domain by VXLAN gateways.

FIG. 5 illustrates an exemplary network architecture where two remotely located data centers are joined to form a single layer-2 broadcast domain by VXLAN gateways. In this example, host 504 hosts VMs 518, 520, and 522. Host 506 hosts VMs 508, 510, and 512. Host 504 is coupled to VXLAN gateway 516, and host 506 is coupled to VXLAN gateway 516. VXLAN gateways 516 and 506 are both coupled to IP network 500, and have established a tunnel 515 between them.

During operation, each VXLAN gateway maintains a set of mapping information that maps not only the local MAC addresses to the VXLAN, but also the MAC addresses in the remote data center to the VXLAN. For example, when VM 508 sends out an Ethernet packet destined for VM 518, VXLAN gateway 514 would encapsulate this Ethernet packet with the VXLAN and IP headers, and send this encapsulated packet via tunnel 515 to VXLAN gateway 516. VXLAN gateway 516 in turn would decapsulate the packet and send the inner Ethernet packet to host 504, which can forward it to VM 518. Essentially, VXLAN gateways 516 and 506 provide the functionality of a VXLAN module in a VXLAN-enabled hypervisor.

Figure 6:
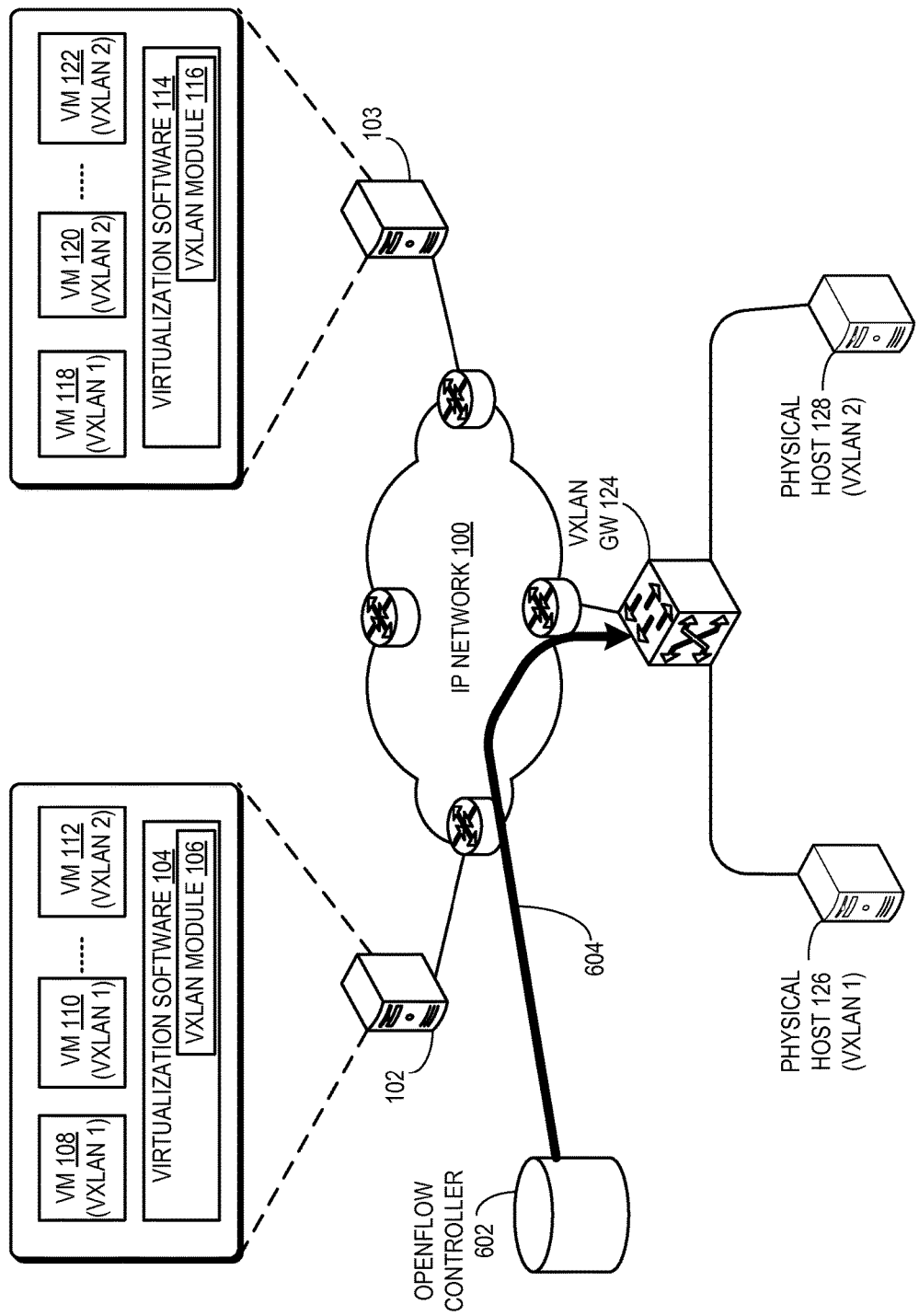
FIG. 6 illustrates an exemplary network architecture that facilitates configuration of a VXLAN gateway using an OpeFlow controller.

As mentioned above, a VXLAN gateway typically maintains a set of mapping information, which maps a MAC address and (optionally) a VLAN tag to a VXLAN ID. Furthermore, the VXLAN encapsulation requires mapping a MAC DA to a destination IP address (either unicast or multicast, depending on the inner Ethernet). In one embodiment, an OpenFlow controller can facilitate such configuration of each VXLAN gateway in the network, as illustrated in FIG. 6. In this example, all the mapping information (which is stored in the form of flow definition) is communicated from an OpenFlow controller 602 to VXLAN gateway 124 via a secure (e.g., SSL) tunnel 604. The configuration information provided by OpenFlow controller 602 can be used by VXLAN gateway 124 to build a forwarding table containing entries for specific flows. Each flow is defined using a 12 tuple value {MAC DA, MAC SA, Ethertype, Source IP, Destination IP, etc. . . . } with the possibility of using wildcards in any field. More details on OpenFlow can be found in https://www.opennetworking.org/images/stories/downloads/specification/openflow-spec-v1.2.pdf, which is incorporated by reference herein.

Figure 7:
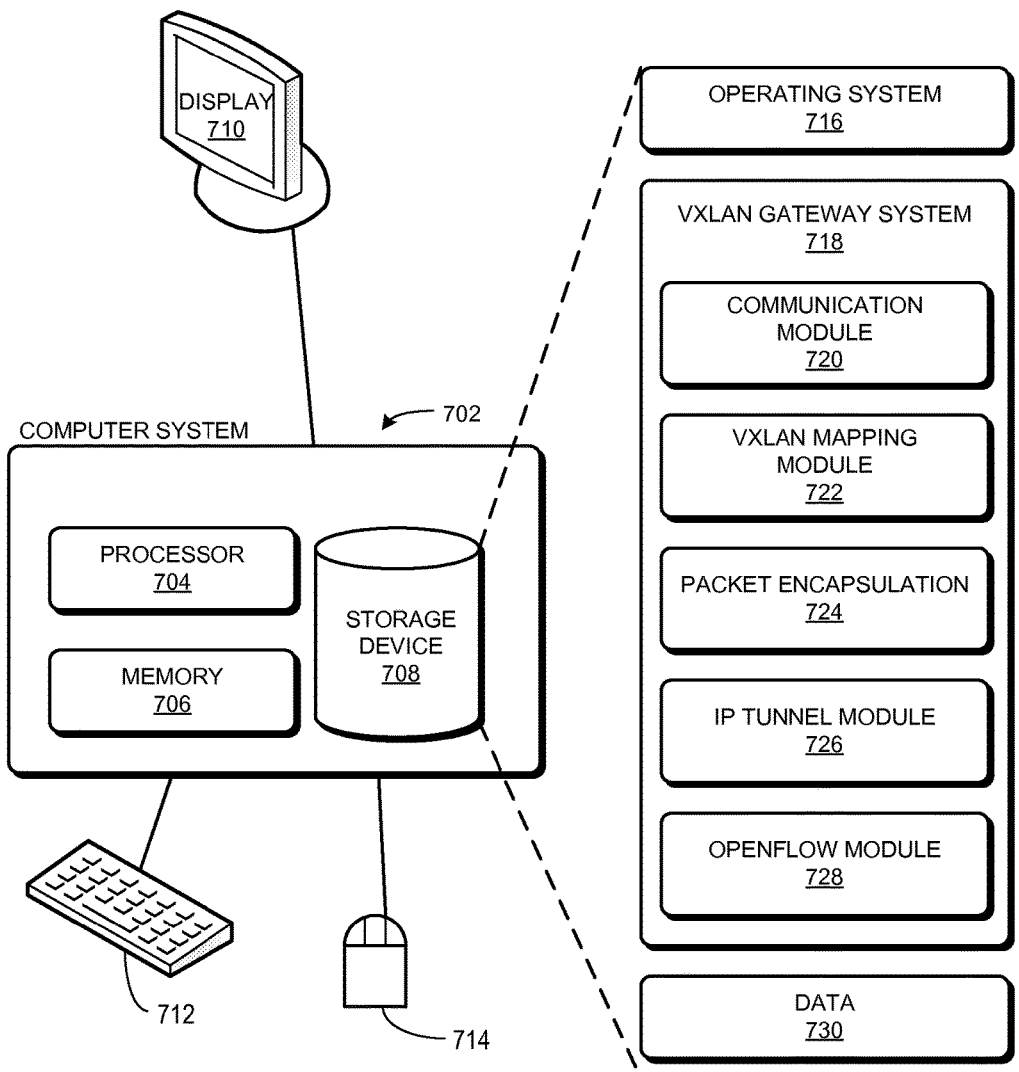
FIG. 7 illustrates an exemplary computer system that facilitates a VXLAN gateway.

It should be noted that the VXLAN gateway described herein can be implemented as a stand-alone appliance, as part of a switch or router, or as part of a host. Furthermore, the VXLAN gateway can be implemented in hardware or software, or a combination of both. FIG. 7 illustrates an exemplary computer system that facilitates a VXLAN gateway. In this example, a computer system 702 includes a processor 704, memory 706, and a storage device 708. Computer system 702 is also coupled to a display 710, a keyboard 712, and a pointing device 708. Storage device 708 stores data 730 and instructions which when loaded into memory 706 and executed by processor 704 implement an operating system 716 and a VXLAN gateway system 718. Gateway system 718 includes a communication module 720, a VXLAN mapping module 722, a packet encapsulation module 724, an IP tunnel module 726, and an OpenFlow module 728. When executed by the processor, these modules jointly or separately perform the functions described above.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. For a physical device separate from sources and destinations of packets in a network, a method for implementing a virtual extensible local area network (VXLAN) gateway, the method comprising:
   through an Internet Protocol (IP) network to which the physical device implementing the gateway connects, receiving an encapsulated packet that originated from a virtual machine residing in a remote layer-2 network broadcast domain;
   decapsulating the packet by removing an IP header of the packet and identifying a VXLAN identifier for the packet, wherein an Ethernet packet remains after decapsulation;
   based at least in part on the VXLAN identifier, determining that a destination for the Ethernet packet is a server separate from the physical device implementing the gateway, the server residing in a local layer-2 network broadcast domain that is different from the remote layer-2 network broadcast domain; and
   forwarding the Ethernet packet to the server on the local layer-2 network broadcast domain.

2. The method of claim 1 further comprising maintaining a data structure that maps the VXLAN identifier to at least one of (i) the server's medium access control (MAC) address and (ii) the server's virtual local area network (VLAN) tag.

3. The method of claim 1, wherein the VXLAN gateway is a first VXLAN gateway, wherein the packet is encapsulated by a second VXLAN gateway to add the VXLAN identifier and IP header to the packet, wherein the method further comprises establishing a tunnel with the second VXLAN gateway.

4. The method of claim 1 further comprising:
   receiving, from the server, a second Ethernet packet destined for the virtual machine residing in the remote layer-2 network broadcast domain;
   encapsulating the second Ethernet packet with the VXLAN identifier and a second IP header; and forwarding the encapsulated second packet to the IP network, thereby allowing the packet to be transmitted to the remote layer-2 network broadcast domain.

5. The method of claim 4 further comprising determining that the second Ethernet packet maps to the VXLAN identifier.

6. The method of claim 1 further comprising receiving configuration information from a controller, wherein the configuration comprises mapping information that maps a set of addresses to the VXLAN identifier.

7. The method of claim 6, wherein the controller is an OpenFlow controller, wherein the configuration information is received as a set of flows from the OpenFlow controller.

8. The method of claim 1, wherein the destination of the Ethernet packet is a virtual machine that operates on the server, wherein a virtual switch that operates on the physical host is not configured to decapsulate packets with VXLAN identifiers.

9. The method of claim 1, wherein the IP header comprises a destination address corresponding to the VXLAN gateway.

10. The method of claim 1, wherein the server is a first server, the local layer-2 network broadcast domain is a first local layer-2 network broadcast domain, the encapsulated packet is a first encapsulated packet, the Ethernet packet is a first Ethernet packet, the virtual machine is a first virtual machine, the remote layer-2 network broadcast domain is a first remote layer-2 network domain, and the VXLAN identifier is a first VXLAN identifier, the method further comprising:
receiving, through the IP network, a second encapsulated packet that originated from a second virtual machine residing in a second remote layer-2 network broadcast domain;
decapsulating the second packet by removing an IP header of the second packet and identifying a second VXLAN identifier for the packet, wherein a second Ethernet packet remains after decapsulation; and
based at least in part on the second VXLAN identifier, determining that a destination for the second Ethernet packet is a second server separate from the physical device implementing the VXLAN gateway, the second server residing in the second local layer-2 network broadcast domain; and
forwarding the second Ethernet packet to the second server on the second local layer-2 network broadcast domain.

11. A non-transitory machine readable medium storing a program which when executed by a set of processing units of a physical device separate from sources and destinations of packets in a network implements a virtual extensible local area network (VXLAN) gateway, the program comprising comprising sets of instructions for:
through an Internet Protocol (IP) network to which the physical device implementing the gateway connects, receiving an encapsulated packet that originated from a virtual machine residing in a remote layer-2 network broadcast domain;
decapsulating the packet by removing an IP header of the packet and identifying a VXLAN identifier for the packet, wherein an Ethernet packet remains after decapsulation;
based at least in part on the VXLAN identifier, determining that a destination for the Ethernet packet is a server separate from the physical device implementing the gateway, the server residing in a local layer-2 network broadcast domain that is different from the remote layer-2 network broadcast domain; and
forwarding the Ethernet packet to the server on the local layer-2 network broadcast domain.

12. The non-transitory machine readable medium of claim 11, wherein the program further comprises a set of instructions for maintaining a data structure that maps the VXLAN identifier to at least one of (i) the server's medium access control (MAC) address and (ii) the server's virtual local area network (VLAN) tag.

13. The non-transitory machine readable medium of claim 11, wherein the VXLAN gateway is a first VXLAN gateway, wherein the packet is encapsulated by a second VXLAN gateway to add the VXLAN identifier and IP header to the packet, wherein the program further comprises a set of instructions for establishing a tunnel with the second VXLAN gateway.

14. The non-transitory machine readable medium of claim 11 wherein the program further comprises sets of instructions for:
receiving, from the server, a second Ethernet packet destined for the virtual machine residing in the remote layer-2 network broadcast domain;
encapsulating the second Ethernet packet with the VXLAN identifier and a second IP header; and
forwarding the encapsulated second packet to the IP network, thereby allowing the packet to be transmitted to the remote layer-2 network broadcast domain.

15. The non-transitory machine readable medium of claim 14, wherein the program further comprises a set of instructions for determining that the second Ethernet packet maps to the VXLAN identifier.

16. The non-transitory machine readable medium of claim 11, wherein the program further comprises a set of instructions for receiving configuration information from a controller, wherein the configuration comprises mapping information that maps a set of addresses to the VXLAN identifier.

17. The non-transitory machine readable medium of claim 16, wherein the controller is an OpenFlow controller, wherein the configuration information is received as a set of flows from the OpenFlow controller.

18. The non-transitory machine readable medium of claim 11, wherein the destination of the Ethernet packet is a virtual machine that operates on the server, wherein a virtual switch that operates on the physical host is not configured to decapsulate packets with VXLAN identifiers.

19. The non-transitory machine readable medium of claim 11, wherein the IP header comprises a destination address corresponding to the VXLAN gateway.

20. The non-transitory machine readable medium of claim 11, wherein the server is a first server, the local layer-2 network broadcast domain is a first local layer-2 network broadcast domain, the encapsulated packet is a first encapsulated packet, the Ethernet packet is a first Ethernet packet, the virtual machine is a first virtual machine, the remote layer-2 network broadcast domain is a first remote layer-2 network domain, and the VXLAN identifier is a first VXLAN identifier, wherein the program further comprises sets of instructions for:
receiving, through the IP network, a second encapsulated packet that originated from a second virtual machine residing in a second remote layer-2 network broadcast domain;
decapsulating the second packet by removing an IP header of the second packet and identifying a second VXLAN identifier for the packet, wherein a second Ethernet packet remains after decapsulation; and based at least in part on the second VXLAN identifier, determining that a destination for the second Ethernet packet is a second server separate from the physical device implementing the VXLAN gateway, the second server residing in the second local layer-2 network broadcast domain; and forwarding the second Ethernet packet to the second server on the second local layer-2 network broadcast domain.

* * * * *